United States Patent [19]

Wesemeyer et al.

[11] 4,359,987
[45] Nov. 23, 1982

[54] DIGITAL TIMING SYSTEM

[75] Inventors: Jurgen Wesemeyer, Nuremberg; Georg Haubner, Berg, both of Fed. Rep. of Germany

[73] Assignee: Robert Bosch GmbH, Stuttgart, Fed. Rep. of Germany

[21] Appl. No.: 229,131

[22] Filed: Jan. 28, 1981

[30] Foreign Application Priority Data

Feb. 22, 1980 [DE] Fed. Rep. of Germany ....... 3006633

[51] Int. Cl.$^3$ .............................................. F02P 5/04
[52] U.S. Cl. .................................... 123/417; 123/416
[58] Field of Search ............... 123/416, 417, 418, 419, 123/480

[56] References Cited

U.S. PATENT DOCUMENTS

| | | |
|---|---|---|
| 4,009,699 | 3/1977 | Hetzler et al. ...................... 123/416 |
| 4,036,190 | 7/1977 | Bigliani et al. ...................... 123/416 |
| 4,081,995 | 4/1978 | Griffith et al. ...................... 123/416 |
| 4,201,159 | 5/1980 | Kawai et al. ......................... 123/417 |
| 4,204,256 | 5/1980 | Klotzner ............................... 123/417 |
| 4,258,683 | 5/1981 | Hattori et al. ....................... 123/416 |
| 4,284,045 | 8/1981 | Maier .................................... 123/416 |

*Primary Examiner*—P. S. Lall
*Attorney, Agent, or Firm*—Frishauf, Holtz, Goodman & Woodward

[57] ABSTRACT

In an ignition system for internal combustion engines, reference mark signals are furnished during the rotation of a shaft of an engine. These signals are also used to compute engine speed. The microcomputer contains a storage (ROM) in which the constants required to approximate one or at the most two characteristic curves of ignition timing advance angle v. engine speed are stored. Interpolation between the one stored curve and a fixed ignition timing angle or by interpolation between the two stored characteristic curves, a family of other characteristic curves can be generated without requiring any further storage locations. The values required for the other characteristic curves are arrived at by interpolation and, preferably, by division or multiplication by factors of 2 which are accomplished by shifting numbers in a register. After the required values have been computed, they are counted down in a counter which, when it reaches a reference value causes the ignition timing signal to be generated.

6 Claims, 5 Drawing Figures

DIGITAL TIMING SYSTEM

CROSS-REFERENCE TO RELATED APPLICATIONS AND PUBLICATIONS (1) DE-OS No. 28 50 534 corresponding to U.S. appln. No. 56,960; filing date July 12, 1979 ff79197/shf/mr.

(2) DE-OS No. 28 51 336; corresponding to U.S. appln. No. 42,360; filing date May 25, 1979; ff79024/shf.

(3) U.S. Pat. No. 4,099,495.

The present invention relates to control apparatus for ignition systems for internal combustion engines, and more particularly, to ignition systems utilizing a microcomputer.

BACKGROUND OF THE INVENTION

In known ignition systems of the above-mentioned type, storage (ROM) is provided in which all the values for approximating a family of curves are stored. Specifically, the family of curves consists of a plurality of curves of ignition timing advance v. engine speed for different values of a predetermined engine parameter such as the pressure in the intake manifold. The capacity of the storage must be such that all values for each curve can be stored. The requirements for the number of storage locations in the ROM thus is a function of the accuracy which is required. At a sufficient accuracy, the ignition timing advance can be very exactly fitted to the particular then-present operating condition of the engine.

THE INVENTION

It is an object of the present invention to allow the family of curves to be approximated to the same accuracy while requiring only one set of storage locations, namely the set of storage locations required for storing the timing advance values required for approximating only one of the curves. This results in a substantial decrease of the required storage capacity. While additional mathematical processing steps are required, these can readily be implemented by additional program steps or, alternatively, a small number of additional mathematical building blocks can be furnished. It is particularly advantageous to implement the additional program steps by sub-programs which are very similar to one another. The additional programming effort therefore is also very small.

Alternatively, the storage capacity can be doubled and all the timing advance values for approximating a first and second one of the curves can be stored. This still represents a considerable reduction of storage capacity relative to the known systems, while allowing a greater accuracy than the embodiment in which only one curve is stored.

DRAWINGS ILLUSTRATING PREFERRED EMBODIMENTS

DESCRIPTION OF THE PREFERRED EMBODIMENTS

Figure 1:
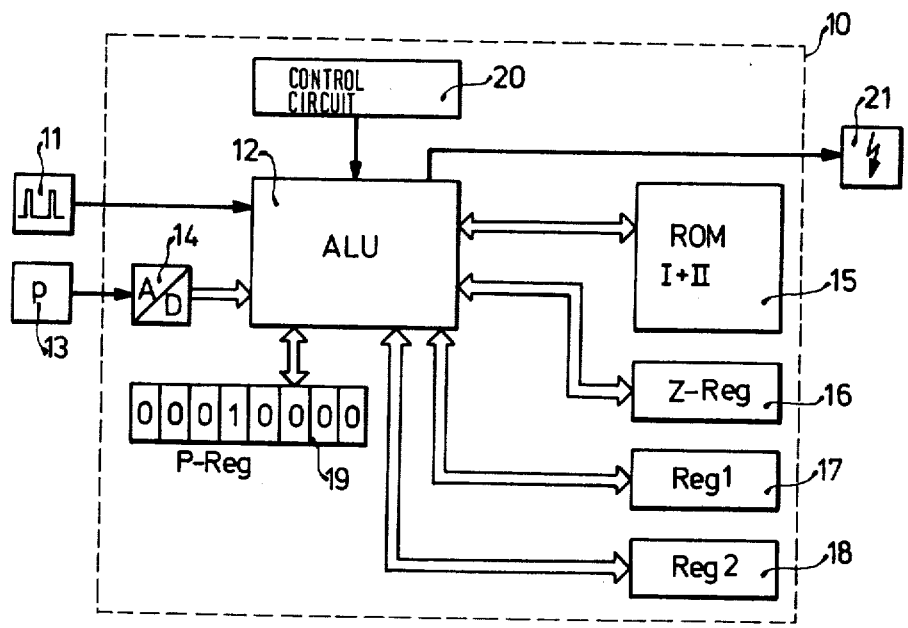
FIG. 1 shows the microprocessor and peripheral units in block diagram form.

In FIG. 1 only those blocks in the microprocessor 10 which are required for implementing the present invention are illustrated. A sensor 11 rotates synchronously with the shaft of the internal combustion engine. It generates reference marks or speed signals and is connected to the central arithmetic and logic unit (ALU) 12 of microprocessor 10. Further, ALU 12 receives a digital number, signifying the pressure sensed by a pressure sensor 13, via an analog-digital converter 14. Pressure sensor 13 may be a vacuum pressure sensor which is operatively associated with the intake manifold. However, other or additional signals (numbers) signifying the then-present values of other operating parameters can also be applied to the ALU 12. Such additional parameters are, for example, the operating temperature, the volume of air, the angle of opening of the throttle valve or the signal of a knock sensor.

A storage unit 15 (ROM) and four registers 16 to 19 are connected through buses with ALU 12. Register 16 is not only a register but also is used to count down from a final computed value to a reference value. When the reference value is reached, an ignition timing signal such as the spark initiating signal or the signal causing a switch in series with the primary winding of the ignition coil to close, is generated. This last operation is well known and is illustrated in greater detail in the cited prior art.

Registers 17 and 18 are buffer storages which temporarily store values during the arithmetic computations which will be explained later. Register 19, which is denoted as a P register, temporarily stores numbers which signify the then-present value of an operating parameter. In the illustrated case, they are therefore numbers or signals which depend on the inlet pressure.

Timing of the operations of ALU 12 is supplied by timing control circuit 20. The operation of such timing control circuits in timing the processing steps and the time intervals which may be required during operation of the system is well known and will be discussed in detail where required for operation of the present invention.

Finally, ALU 12 is connected to the output stage 21 of the ignition system. The latter comprises, as is also well known, an electrical circuit connected to the primary winding of the ignition coil. Again, a description of such an output circuit can be found in the above-mentioned prior art.

Figure 2:
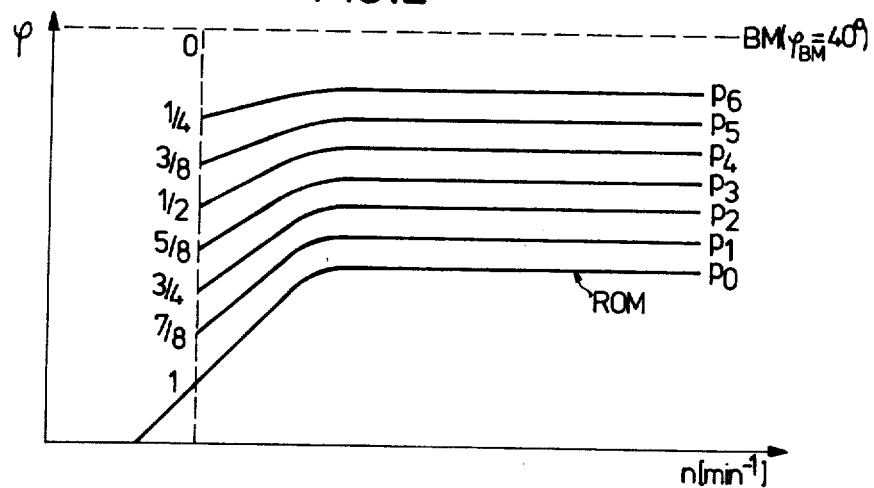
FIG. 2 shows the family of curves of ignition timing advance v. engine speed at different values of pressure to illustrate operation of the apparatus when only one characteristic curve is stored in the storage.

A family of ignition timing curves is shown in FIG. 2. The curves are plots of ignition timing advance v. engine speed for a number of different pressure values. The timing advance is denoted by the angle with reference to top dead center. The pressure dependent value is sensed by sensor 13. It is changed into a digital number in analog-digital converter 14 and is temporarily stored in register 19. It remains stored in register 19 until a new value is called up by ALU 12 in response to a signal from timing control circuit 20. The reference mark signal (BM) which is generated by speed sensor 11 is, in the illustrated example, generated 40° prior to the top dead center. The curve denoted by numeral 1 is in the characteristic curve having the least timing advance angle relative to top dead center. The values required for approximating the characteristic curves between the two above-mentioned curves are computed by interpolation. If the sensed pressure p is less than p0 (high degree of vacuum), the values stored in the storage are used directly, that is, curve 1 is approximated. For increasing pressures between pressure p0 and pressure $p^6$ (decreasing vacuum) step transistors to the values required to implement characteristic curves ⅛ to ¼ take place. For further increases in pressure, the values for implementing curve ¼ are used. The steps are selected as required for a particular application. Both fewer and more characteristic curves can be utilized and can be readily implemented since only interpolation on the computer is required.

It is also not necessary that the top curve be the curve for a 40° advance. Any other conveniently generated curve can be used, for example, the upper reference curve can represent top dead center directly. It must only be remembered that the curves to be interpolated must be between the value in stored in ROM 15 and the upper characteristic curve, however generated.

Figure 3:
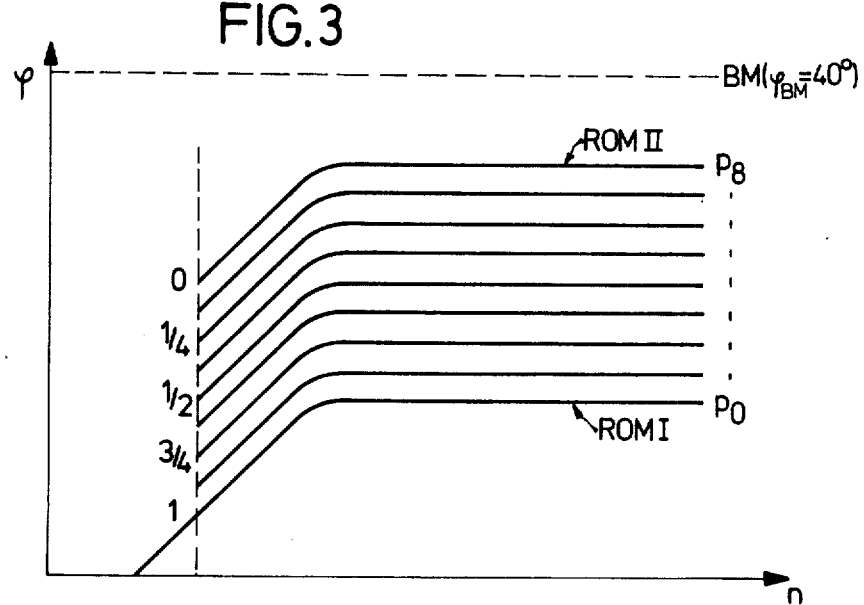
FIG. 3 is a diagram for explaining the interpolation of characteristic curves when two such curves are stored in the ROM.

The diagrams shown in FIG. 3 illustrate the case where interpolation takes place between two characteristic curves stored in read only memories (ROM I=1 and ROM II=0). Both curves used in the interpolation process can now represent an independent variable which varies as a function of speed, rather than use of an independent variable which remains constant as a function of speed as was the case in the illustration of FIG. 2. Of course, twice the number of storage locations must now be made available. However, a greater flexibility in generating the interpolated curves results. The transistion from one curve to the next takes place as discussed in the system implementing the arrangement illustrated in FIG. 2.

Figure 4:
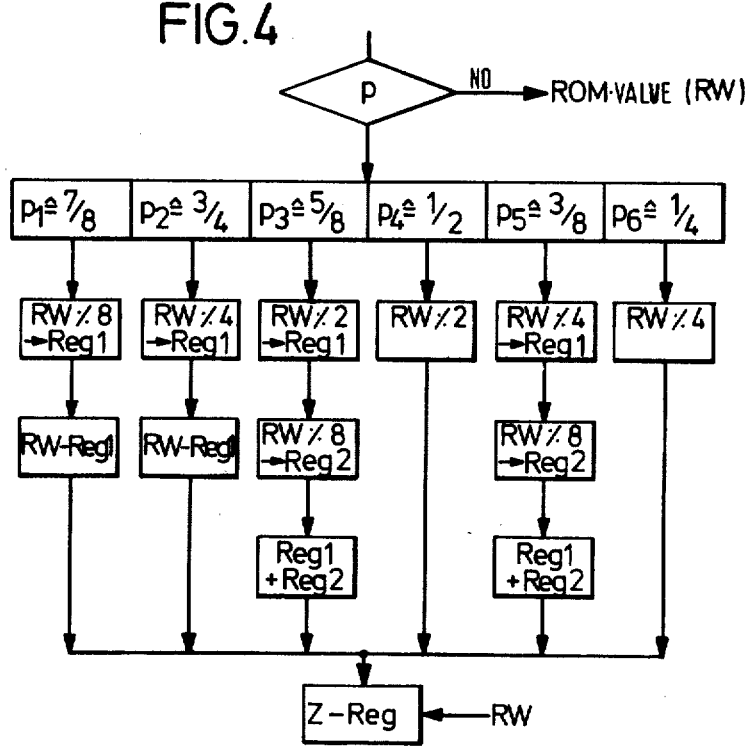
FIG. 4 is a flow chart for the microprocessor of FIG. 1 operated in accordance with FIG. 2.

The flow chart shown in FIG. 4 illustrates the sequence of computer operations required for interpolating the characteristic curves illustrated in FIG. 2. In the first step, the contents of register 19 are interrogated by ALU 12. If the pressure p is less than pressure p0, the value stored in ROM 15 is read out. Specifically, the number representing the then-present speed as sensed by sensor 11 and computed in ALU 12 is used to address ROM 15. The value in the storage location is read out and transmitted to register 16. After receipt of the next reference mark, this value is counted down and, when the count reaches 0, the required ignition control signal is generated.

If, on the other hand, the value in register 19 exceeds p0, i.e. is between value p1 and value p6, one of curves ⅞ to ¼ is selected. Specifically, the curve is selected whose pressure value is closest to that of the actual existing pressure and the corresponding sub-program is switched in. This can also be accomplished by hard wired logic units. If, for example, the pressure p equals p1, characteristic curve ⅞ is selected by switching in the corresponding sub-program. The value read out from ROM 1 is divided by 8 and stored in register 17. In the next step, the value in register 17 is substracted from the value (RW) read out from the storage. The difference is stored in counter-register 16 and, after receipt of the next reference mark, is counted down. Since the timing advance angle at which the reference mark is generated is considered zero, the above-mentioned operations correspond to computing ⅛th of the difference between the reference mark angle and the timing advance angle read out from the ROM, with a subsequent subtraction of the so computed angle from the reference mark angle. For approximating characteristic curve ¾, the corresponding computer operations are carried out, the difference being that the value read out from the ROM (RW) is only divided by four. For characteristic curve ⅝, the value RW is first divided by 2, and the result is stored in register 17. Afterwards, the value RW is divided by 8 and the result stored in register 18. Thereafter, the contents of register 17 are added to those of register 18 and the result is stored in register 16.

For characteristic curve ⅜, corresponding computer operations are carried out with the difference that first the value RW is divided by 4. Finally, the characteristic curves ½ or ¼, the value RW is divided by 2 or 4, respectively, and the result is directly stored in the register 16. All of these division and multiplication operations can be carried out very simply since division by 2, 4 or 8 can be achieved simply by shifting the value in the register.

Figure 5:
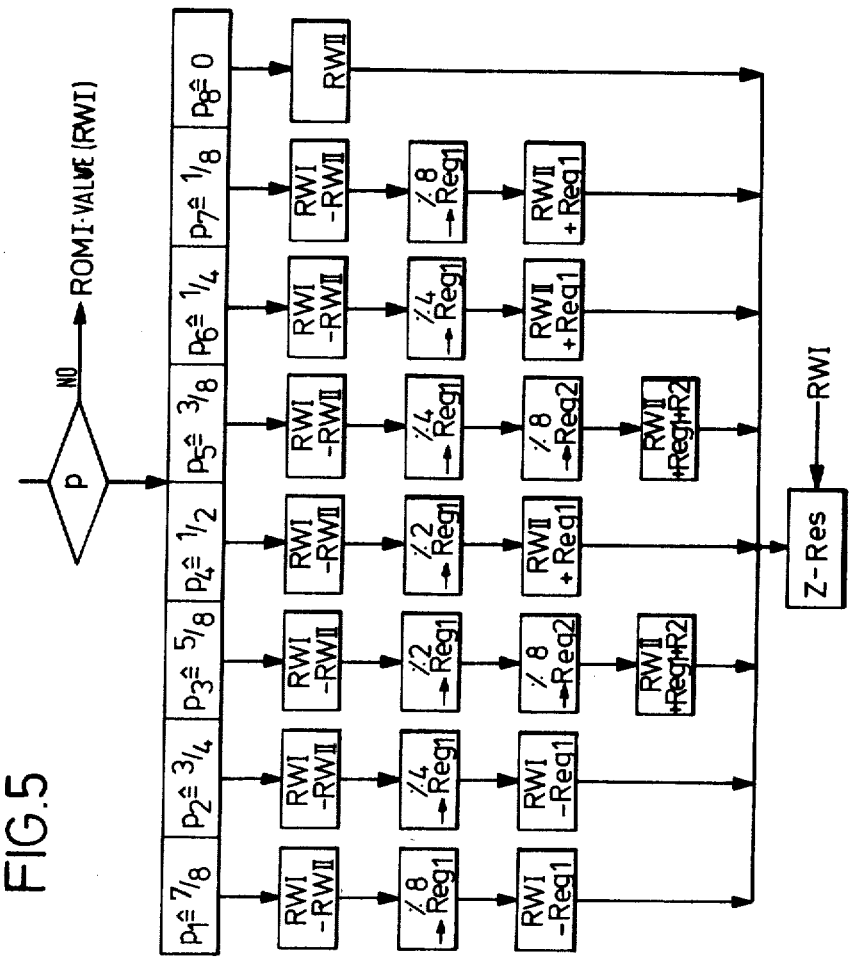
FIG. 5 is a flow chart for the microprocessor of FIG. 1 operated in accordance with FIG. 3.

The flow chart in FIG. 5 corresponds to the operation illustrated in FIG. 3. As shown in FIG. 3, the values stored in ROM 1 are the values for approximating curve 1 while the values stored in ROM 2 are the values for approximating curve 0. First, the value stored in ROM 1 is read out in accordance with the then-present speed value. It will be noted that any one of seven characteristic curves may be approximated by interpolation. For all curves to be interpolated, the first step is a subtraction of the value in ROM 2 from that of ROM 1. Next, a division is carried out and the results stored in register 17. For characteristic curve ⅞ and ⅛, the division is by 8, for characteristic curves ¾, ⅜ and ¼, the division is by 4, and for characteristic curves ⅝ and ½, the division is by 2. For characteristic curves ⅞ and ¾, the value stored in register 17 is subtracted from the value read out from ROM 1 and the result is stored in register 16. For characteristic curves ½, ¼ and ⅛, the value stored in register 17 is added to the value stored in ROM II and the result is transferred to register 16. Finally, for characteristic curves ⅝ and ⅜, the difference between the two values read out from the storages (RW I-RW II) is divided by 8 and the result stored in register 18. Subsequently, the value read out from ROM II is added to the contents of registers 17 and 18 and the result transferred to register 16.

It must again be stressed that by increasing or decreasing the number of computation steps, the number of characteristic curves which can be interpolated can be increased or decreased. The timing is preferably so controlled that right after the ignition timing, that is, at the end of count down of the value in register 16, the computations are carried out which result in the new value for register 16. When the next reference mark generated by sensor 11 appears, the value then present in counter-register 16 is counted down so that the next ignition timing signal is generated.

It is evident from the foregoing description that the process of arithmetic interpolation simply applies a proportionality factor corresponding to the particular interpolation step. In the case of FIG. 2, where all timing angle values are with reference to the horizontal broken line at the top which, of course, represents a constant timing angle for all speeds, only the curve most distant from that horizontal line needs to be stored in the ROM and the proportionality factor is applied to a value on that curve. In the case of FIG. 3 the proportionality factor is applied to the difference in angle value between two curves. It is further evident from FIGS. 4 and 5 that it is a convenient way of multiplying by the proportionality factor indicated on the curves of FIG. 2 or FIG. 3, is offered by an equivalent calculation by means of one or more division steps and a subtraction step, and in some cases adding up the results of division steps before subtracting from the timing angle value given in curve 1.

Various changes and modifications may be made within the scope of the inventive concepts.

We claim:

1. In an internal combustion engine having a shaft, means rotating with said shaft for furnishing a first signal when said shaft rotates through a predetermined reference position, means (13) for measuring a predetermined operating parameter or said engine and furnishing an input signal corresponding to the so-measured value, and means (11) for furnishing speed signals in response to said first signal: apparatus for approximating a plurality of curves of ignition timing advance angle v. engine speed for different values of said parameter, comprising storage means (15) having a plurality of addressable storage locations for storing all timing advance angle values with reference to a constant timing advance angle required to approximate one of said curves;

means connected to said speed signal furnishing means and said storage means for reading out a timing advance value from a storage location addressed by said speed signal;

computer means (12, 16, 17, 18, 19) connected to said read out means and said measuring means for translating said input signal value into a designation of one of a plurality of steps of input signal value to each of which a predetermined proportionality factor is assigned, the proportionality factor 1 being assigned to the input value step corresponding to the value of said parameter for which the timing advance values are stored with reference to said one of said curves in said storage means (15), and multiplying the timing advance angle signal read out by said read out means by the proportionality factor assigned said input value step designated by said input signal as translated by the computing means, to obtain a proportionalized timing advance angle signal, and means for producing an ignition timing signal timed to correspond to said proportionalized timing advance angle signal.

2. Apparatus as set forth in claim 1 in which said one of said curves for the approximation of which timing angle values are stored in said storage means is that one of said curves having the largest timing angle values with reference to said constant timing advance angle, whereby all said proportionality factors are less than unity, and in which said computer means is constituted to multiply said timing advance angle signal read out by said read-out means by said proportionality factor by a series of equivalent numerical operations of division and algebraic addition.

3. In an internal combustion engine having a shaft, means rotating with said shaft while furnishing a first signal when said shaft rotates to a predetermined reference position, means for measuring a predetermined operating parameter of said engine and furnishing an input signal corresponding to the so-measured value, and means for furnishing speed signals in response to said first signal: apparatus for interpolatively approximating a plurality of curves of ignition timing advance angle v. engine speed for different values of said parameter, comprising storage means (15) having a plurality of addressable storage locations for storing all timing advance angle values required to approximate that one of said curves having the lowest timing advance angle values and that one of said curves having the highest timing advance angle values;

means connected to said speed signal furnishing means and said storage means for reading out pairs of timing advance values, one relating to each one of said two curves for which timing advance angle values are stored in said storage means, from storage locations addressed by said speed signal;

computer means connected to said read-out means and said measuring means for translating said input signal value into a designation of one of a plurality of steps of input signal value lying between the input signal values corresponding to the two curves for which timing angle values are stored in said storage means, a proportionality factor less than unity being assigned to each of said steps;

determining the difference between the pair of timing advance values read out by said read-out means;

multiplying the difference found between said pair of timing advance values by the proportionality factor assigned to said input value step designated by said input signal as translated by the computing means and adding the result algebraically to one of said timing advance values of said pair of values read out by said read-out means, to obtain an interpolated timing advance angle signal, and means for producing an ignition timing signal timed to correspond to said interpolated timing advance signal.

4. Apparatus as set forth in claim 3 in which said computer is constituted for multiplying the difference between said paired timing advance angle values by said proportionality factor and algebraically adding the product thus obtained by means of an arithmetically equivalent series of operations including at least one division and at least one algebraic addition.

5. Apparatus as set forth in claim 2 or claim 4 further comprising a first register (19) connected to said computer means for storing said input signal and thereby facilitating the translation of said input signal value into a designation of one of a plurality of interpolation steps.

6. Apparatus as set forth in claim 2 or claim 4 in which said means for producing an ignition timing signal includes a counter for counting down the timing advance signal supplied by said computer means and to furnish an ignition control signal when the count in said counter reaches a predetermined value.

* * * * *